United States Patent
Ishiguro et al.

(10) Patent No.: US 6,891,644 B1
(45) Date of Patent: May 10, 2005

(54) IMAGE PROCESSING DEVICE AND IMAGE PROCESSING METHOD

(75) Inventors: Kazuhiro Ishiguro, Toyohashi (JP); Junji Nishigaki, Toyokawa (JP); Mitsuru Obara, Toyohashi (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/434,293

(22) Filed: Nov. 5, 1999

(30) Foreign Application Priority Data

Nov. 6, 1998 (JP) .......................................... 10-315830

(51) Int. Cl.[7] ................................................. H04N 1/04
(52) U.S. Cl. ............. 358/474; 358/426.01; 358/426.16; 358/462; 358/468; 382/232; 382/248; 382/250
(58) Field of Search .................. 358/462, 426.1–426.16, 358/468, 453, 497, 474; 382/232–250

(56) References Cited

U.S. PATENT DOCUMENTS 4,562,485 A * 12/1985 Maeshima .................. 358/280

FOREIGN PATENT DOCUMENTS

| JP | 5-328055 | * | 12/1993 | |
| JP | 7-245682 | * | 9/1995 | |
| JP | 09172525 A | * | 6/1997 | ............ H04N/1/10 |
| JP | 10233916 A | * | 9/1998 | .......... H04N/1/387 |

* cited by examiner

Primary Examiner—Edward Coles
Assistant Examiner—Heather D Gibbs
(74) Attorney, Agent, or Firm—McDermott Will & Emery LLP (57) ABSTRACT

An image processing system provided with a line sensor for reading image signals in line units. First, the line sensor scans a document in a normal direction. At this time the image data obtained by the scan are subjected to image processing such as compression and the like. Areas of image data that cannot be processed to the high moving speed of the scanner are subjected to image processing by later performing a scan in the reverse direction.

9 Claims, 6 Drawing Sheets

IMAGE PROCESSING DEVICE AND IMAGE PROCESSING METHOD

This application is based on Patent Application No. 10315830 filed in Japan, the content of which is hereby incorporated by reference.

BACKGROUND OF THE INVENTION

1. Field of the Invention

The present invention relates to an image processing device and an image processing method, and specifically relates to an image processing device and an image processing method for processing image data obtained by reading a document image.

2. Description of the Related

Conventional image processing devices are known to read a document image by scanning a document via a line scanner, and perform image processing such as compression and the like of the obtained image data.

For example, the time required for processing increases when image data obtained by reading an image in fine checkerboard pattern is subjected to run length compression. Accordingly, when image reading and image processing are performed in parallel, an expensive image processing device must be used to reduce the scan speed or increase the processing speed so as to process image data requiring a long processing time. Normally, however, image processing devices do not handle image data in fine checkerboard pattern. Accordingly, processing efficiency is required for image data requiring a short processing time and reducing the scanning speed for image data requiring a long processing time. The use of expensive image processing devices is related to the increase in cost of image processing devices.

OBJECTS AND SUMMARY

An object of the present invention is to provide an improved image processing device and image processing method.

Another object of the present invention is to provide an inexpensive image processing device and image processing method which improve the efficiency of image processing.

These objects are attained by the image processing device comprising a first processing controller for dividing image data on one frame into a plurality of block units and sequentially processing the image data of the plurality of block units; a detecting controller for detecting the image data of an unprocessible block unit for said first processing controller among the image data of the plurality of block units; and a second processing controller for processing the image data of the detected block unit.

The detecting controller detects the overflow of the first process.

It is desirable that the first process is executed synchronously with the scanning operation in a first direction of a document, and the second process is executed synchronously with the scanning operation in a second direction of a document.

These objects are also attained by the image method comprising a first scanning step of scanning a document to provide an image data; a first processing step of processing the image data which is provided by said scanning operation synchronously with the scanning operation; a detecting step of detecting the image data of an unprocessible part for said first processing step among the image data provided by said first scanning step; a second scnning step of scanning the document again to provide the image data corresponding to the unprocessible part; and a second processing step of processing the image data of the unprocessible part which is provided by said second scanning step.

Accordingly, the present invention provides an image processing device and image processing method having excellent image processing efficiency by processing image data by a second process when there are parts of image data that cannot be processed by a first process. Even when there are parts of image data that cannot be processed by a first process, the processing speed of the first process need not be increased since such unit image data can be processed via a second process. In this way the present invention provides an inexpensive image processing device and an image processing method.

BRIEF DESCRIPTION OF THE DRAWINGS

These and other objects and features of the present invention will become apparent from the following description of the preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

Figure 1:
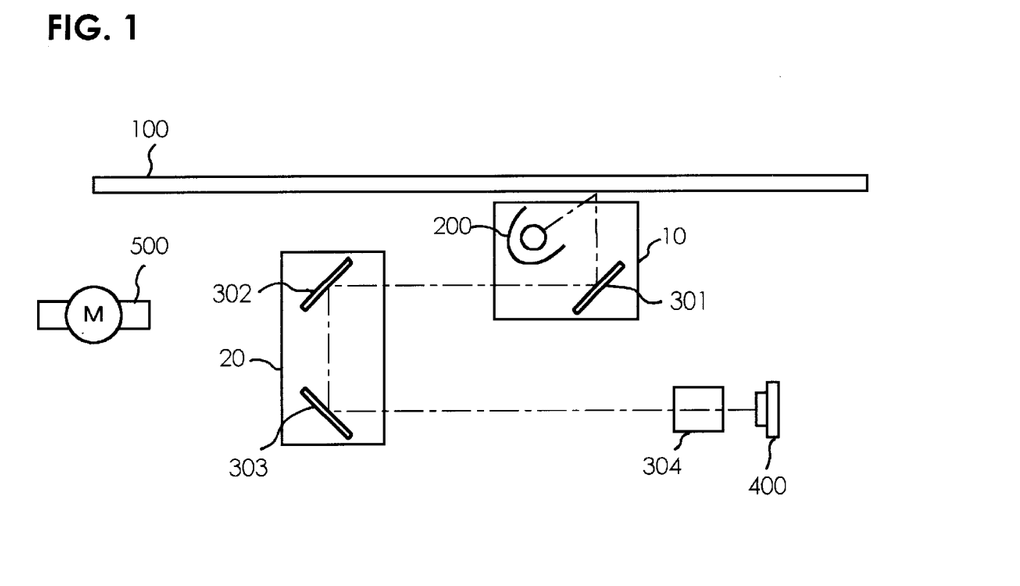
FIG. 1 is a schematic view showing the construction of an image reading device.

FIG. 1 is a schematic view showing the construction of an image reading device. Referring to the drawing, the image reading device is provided with a platen glass 100 for placement of a document. A scanner positioned below the platen 100 reads a document placed face downward on the platen 100. The scanner is provided with an exposure lamp 200 for illuminating the document. The light emitted from the exposure lamp 200 is reflected by the image surface of the document, then reflected by the mirrors 301, 302, 303, and enters the projection lens 304. The projection lens 304 forms an image of the incident light on the line sensor 400, so as to project an image of the document image on the line sensor 400. Since the line sensor 400 has a linear array of a plurality of image sensing elements (i.e., CCD sensors), it outputs specific image signals as electric signals in accordance with the amount of light of the projected document image. The exposure lamp 200 and the mirror 301 are installed on a first slider 10, and the mirrors 302 and 303 are installed on a second slider 20. Scanning is accomplished by moving the first slider 10 and the second slider 20 reciprocatingly in the arrow directions in the drawing beneath and along the platen 100 via a drive force provided by a drive motor 500. A uniform constant distance from the document surface to the line sensor 40 is maintained during scanning movement by moving the second slider 20 at ½ the speed of the first slider 10. The image sensing element of the line sensor 400 is arrayed in a direction perpendicular to the direction of scanning movement, such that the document image is read sequentially by the line sensor 400 via the scanning movement to obtain image signals of the entire document image.

Figure 2:
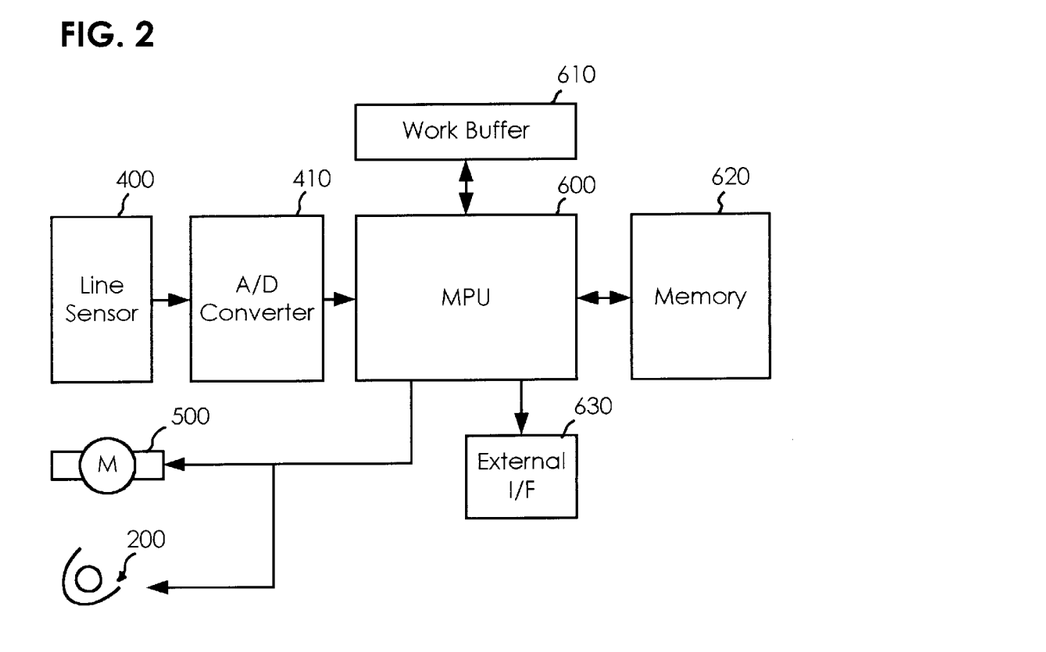
FIG. 2 is a block diagram showing the construction of the signal processing unit of the image reading device.

FIG. 2 is a block diagram showing the construction of the signal processing unit of the image reading device of FIG. 1. Referring to the drawing, the signal processing unit is provided with a microcomputer 600 for executing various types of signal processing. Electric signals obtained by the image sensing element (CCD sensor) 400 are converted to digital image data by an analog-to-digital (A/D) converter 410 so as to be processable by the microcomputer 600. The A/D converted image data are process in 1-line units by the microcomputer 600. A work buffer 610 is a buffer memory for temporarily storing one line of image data when the microcomputer 600 is processing image data. A memory 620 stores the image data processed by the microcomputer 600. A peripheral interface 630 is used when the image data stored in the memory 620 is transmitted to an external device. The drive motor 500 and the exposure lamp 200 are connected to the microcomputer 600 and are controlled by the microcomputer 600.

Figure 3A:
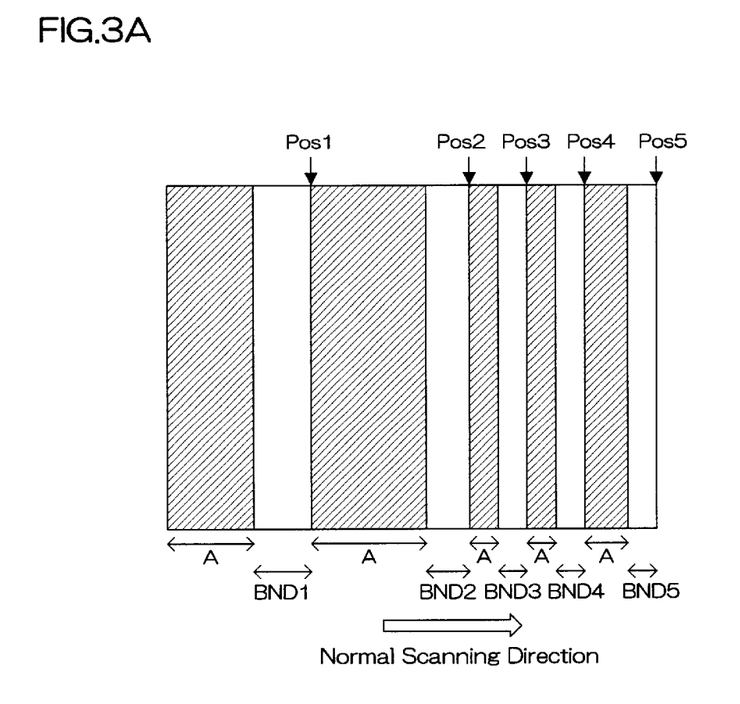
FIG. 3A is a schematic view of the image area processed by a scanning operation in a normal direction of the image reading device.
Figure 3B:
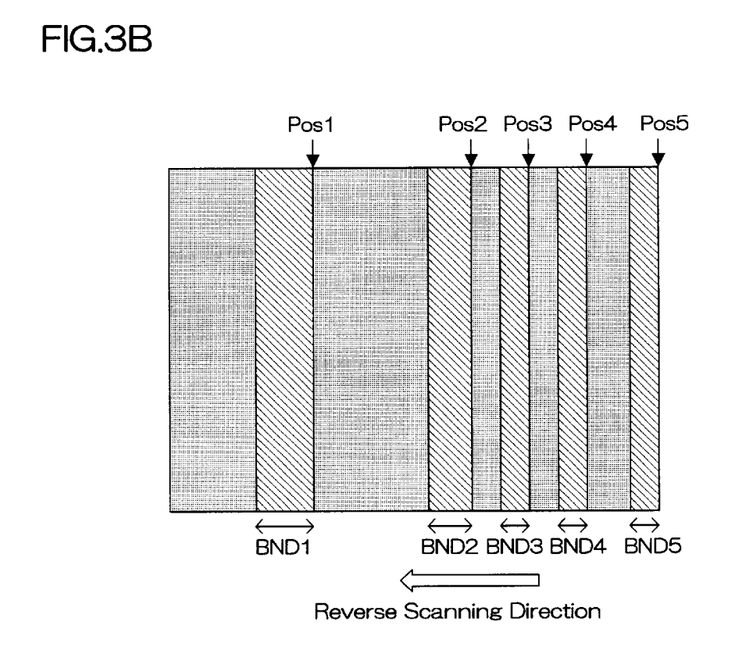
FIG. 3B is a schematic view of the image area processed by a scanning operation in a reverse direction of the image reading device.

FIGS. 3A and 3B show the operation sequence of the image reading device. First, as shown in FIG. 3A, image data of a document image read by scanning in the normal direction are generated and simultaneously compressed. The time required to compress the image data differs depending on the content of the image data. Accordingly, regions of completed image data compression processing (regions A indicated by the shaded regions) and regions not suitable for compression processing, i.e., regions not compressed (indicated as non-shaded regions) are generated from the relationship with the scanning speed. At this time, the information Pos1~Pos2 at the trailing edge position of the regions that cannot be compressed, and the information BND1~BND2 representing the width of those regions are stored in the memory 620.

Thereafter, as shown in FIG. 3B, the document is scanned in the reverse direction from the values of the Pos1~Pos2 and BND1~BND2 to read and compress the image data of the regions which could not be compressed by the prior scanning in the normal direction. The relationship between the scanning speed and the processing speed of the microcomputer 600 is regulated beforehand to enable the compression processing of all image data by the normal scan alone relative to a normal document which does not require time for compression processing.

When a document contains an image such as a fine crosshatched pattern or the like which requires a long processing time, the image is compressed by scanning in the reverse direction. In this way a normal document can be processed at high speed, and a document including an image requiring a long processing time can be reliably read by scanning in the reverse direction.

According to the present embodiment, the mechanical part of the construction which performs scanning may be left intact while changing the processing circuits or microcomputer. In this way the functionality of the image reading device can be simply improved.

Figure 4:
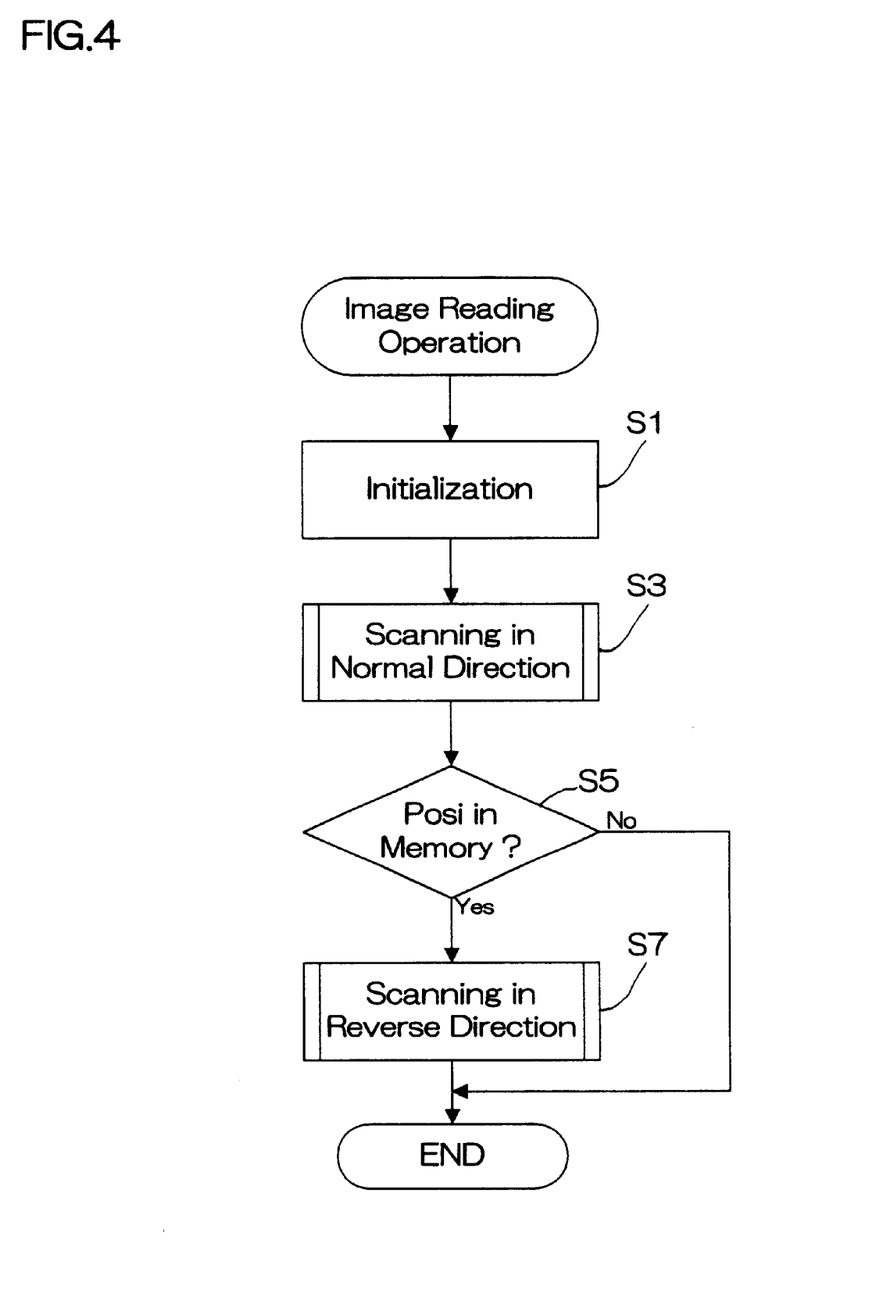
FIG. 4 is a flow chart of the operation sequence of the image reading device.

FIG. 4 is a flow chart showing the operation sequence of the image reading device. Referring to the drawing, settings are initialized in step S1. In step S3, scanning in the normal direction is executed, and compression processing of the image data of each one line is executed. In step S5, a check is made to determine whether or not there are regions that could not be compressed. If there is a region that could not be compressed (step S5: YES), in step S7 a scan in the reverse direction is executed to read and compress the image data of the uncompressible region scanned in the normal direction based on the trailing edge position information Pos1~Pos2 and width information BND1~BND2 of the region. However, if it is determined that all image data have been compressed in step S5 (step S5: NO), the image reading ends directly without scanning in the reverse direction.

Figure 5:
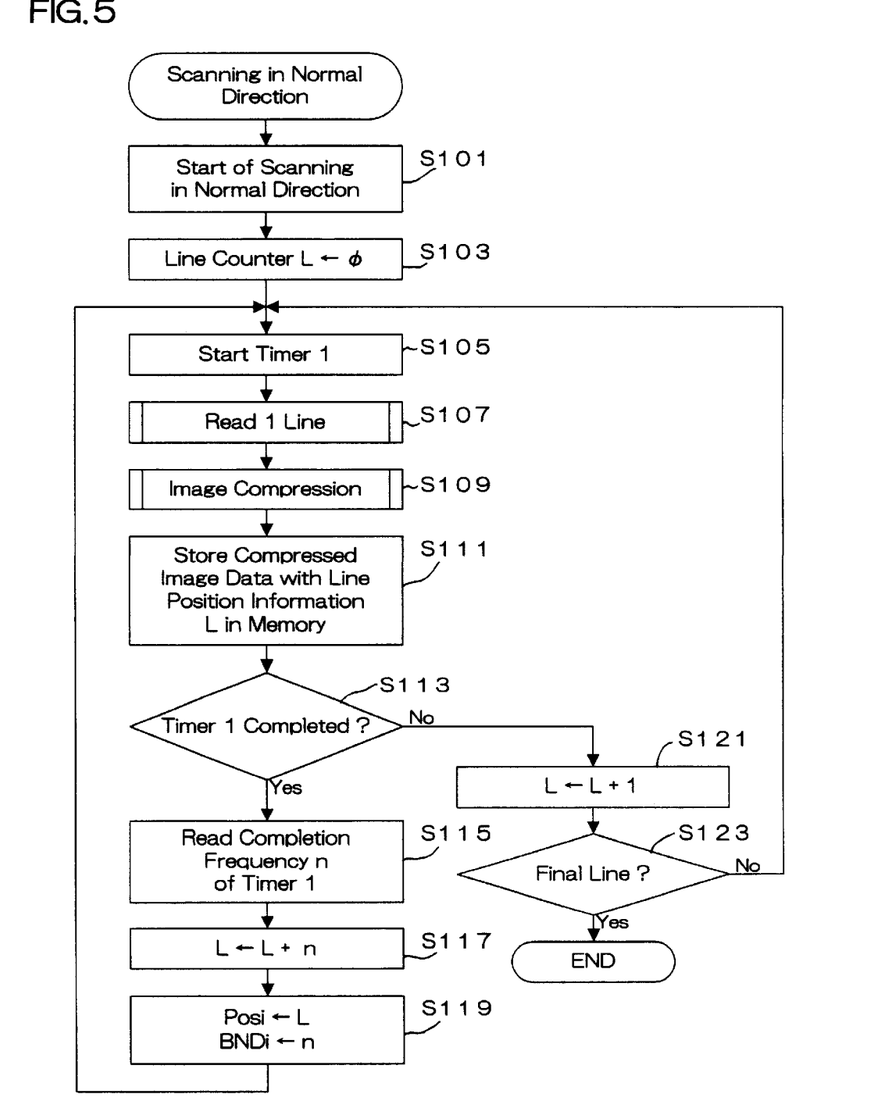
FIG. 5 is a flow chart of the operation sequence of the image reading device.

FIG. 5 is a flow chart showing the content of the scanning process in the normal direction of step S3 in FIG. 4. Referring to the drawing, in step S101 the scan in the normal direction is started. In step S103, [0] is substituted for the value of the line counter L. In step S105, a clock is started by the timer 1. The timer 1 is a timer for counting a fixed time required for scanning one line of a document, and is a ring counter which counts the fixed time, then starts counting again. In step S107, the image data (unit image data) of one line of a document is read. In step S109, the read image data are subjected to compression processing. In step S11, line position information L is appended as a header to the compressed image data and stored in the memory 620.

Figure 6:
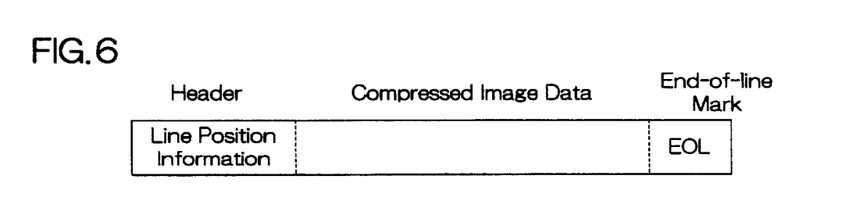
FIG. 6 is a schematic view of the structure of the image data stored in memory.

FIG. 6 shows an example data stored in the memory 620. Referring to FIG. 6, the data includes a header portion containing the line position information L, and the compressed image data and the end-of-line mark EOL.

In step S113, a determination is made as to whether or not the count of the timer 1 has completed the fixed time count. If the determination is YES, i.e., when the scan time of one line has elapsed and the compression process has been completed, the routine advances to step S115, and the completion frequency n of the timer 1 is read. Then, in step S17, n is added to the value of the line counter L, and in step S119, the value L is substituted for the value of the Posi, and the value n is substituted for the value of BND i. Thereafter, the routine returns to step S105, and processing starts for the line currently being read.

When the scan time for one line has elapsed and the compression process has ended in the processes of steps S113, S115, S117 and S119, then, since the compression process could not be executed for the image data of the line, a determination is made as to the line of image data that could not be compressed, and the trailing end position information Posi and the region width information BNDi are determined.

If the determination in step S113 is NO, since the compression process has ended during the scan time of one line, the routine advances to step S121, the value of the line counter is incremented 1, and in step S123 a determination is made as to whether or not the final line has been reached. If the determination is YES, the normal scan process ends, whereas if the determination is NO, the routine returns to step S105.

Figure 7:
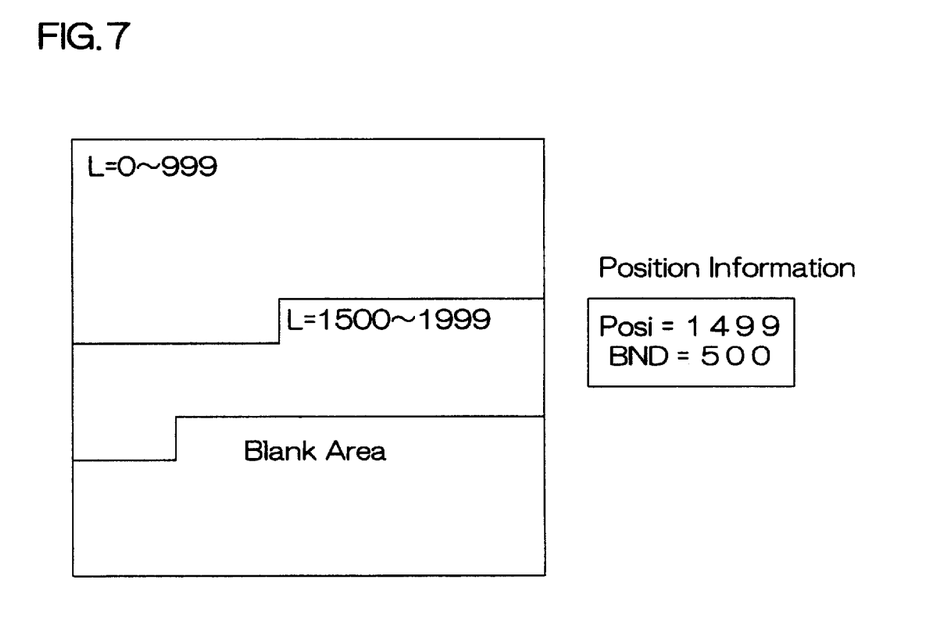
FIG. 7 is a schematic view of the condition of image data stored in memory.

FIG. 7 shows an example of image data stored in the memory 620 at the moment the scan ends in the normal direction. Referring to FIG. 7, the compressed image data of the one line shown in FIG. 6 are stored in the compression processing sequence in the memory 620. The image data of lines 0–999 are compressed in real time during the scan in the normal direction, and stored in the memory 620. The compression of lines 1000 to 1499 cannot be processed during the scan in the normal direction, and are not stored in the memory 620 when the scan ends in the normal direction. Thereafter, the data of lines 1500 to 1999 are compressed in real time, and stored in the memory 620. At this time, Pos=1499 and BND=500 are stored in the memory 620 as position information of image data which could not be read.

When the time required to compress the image data of one line exceeds the time required to scan one line of the document, i.e., when the compression process overflows, the overflow final value Posi and the overflow line number BDN I are stored in the memory 620. In the scan in the normal direction, the region of the overflow width BNDi is not processed.

Figure 8:
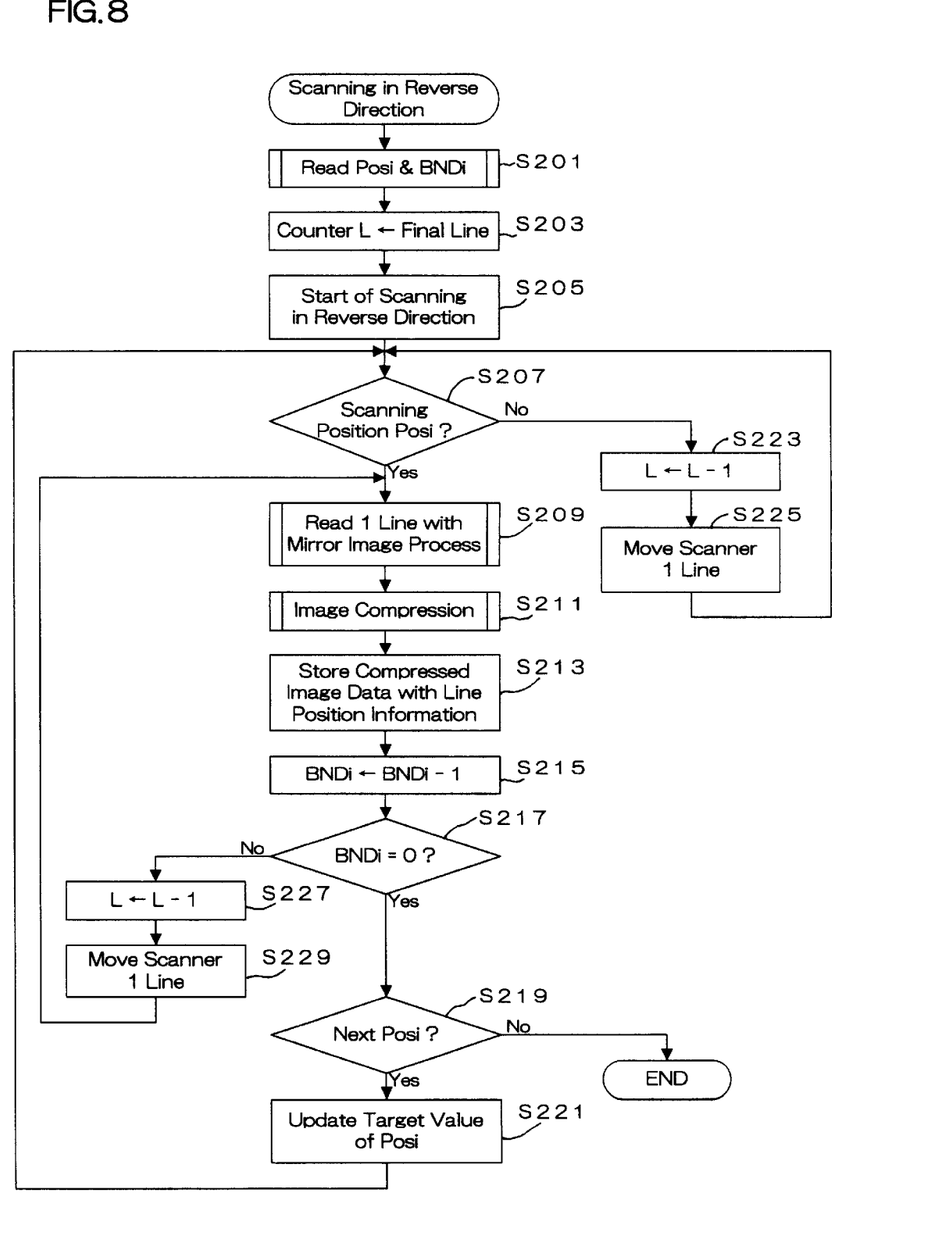
FIG. 8 is a flow chart showing the operation sequence of the image reading device.

FIG. 8 is a flow chart showing the content of the scanning process in the reverse direction (S7) of FIG. 4. In the scan in the reverse direction, processing is executed for the regions which could not be compressed during the scan in the normal direction. Specifically, the scanner is moved to the region that could not be processed during scanning in the normal direction, and processing is executed for each line. In the scan in the reverse direction, the image data are subjected to a mirror image process to reverse the image relative to the scan in the normal direction. The processed image data are stored in the empty region of the memory 620 shown in FIG. 7.

Referring to FIG. 8, in step S201, the final recorded values Posi and BNDi are read. Specifically, in the example shown in FIG. 3A, the value of Pos5 and the value of BND5 are read.

Then, in step S203, the count value of the final line is substituted in the value of the line counter L (i.e., 1999 in the example of FIG. 7). In step S205, the scan in the reverse direction is started. In step S207, a determination is made as to whether or not the scanner has reached the position represented by Posi. If the determination is NO, in step S223 the value of the line counter L is incremented 1, and in step S225 the scanner is moved one line, and the routine returns to step S207. If the determination is YES in step S207, then in step S209 the data of one line are read, and subjected to the mirror image process. Then, in step S211, these image data are subjected to the compression process. In step S213, line position information is appended to the header of the compressed image data and stored in memory. In step S215, the value of BNDi is decremented 1, in step S217 a check is made to determine whether or not BNDi=0.

If the determination in step S217 is NO, in step S227 the value of the line counter L is decremented 1, and in step S229 the scanner is moved one line, and thereafter the routine continues to step S209. If the determination in step S207 is YES, in step S219 a determination is made as to whether or not there are a next Posi data. If the determination is YES, in step S221 the target value of Posi is updated, and the scanner is moved, and the routine returns to step S207. If the determination in step S209 is NO, this routine ends.

Figure 9:
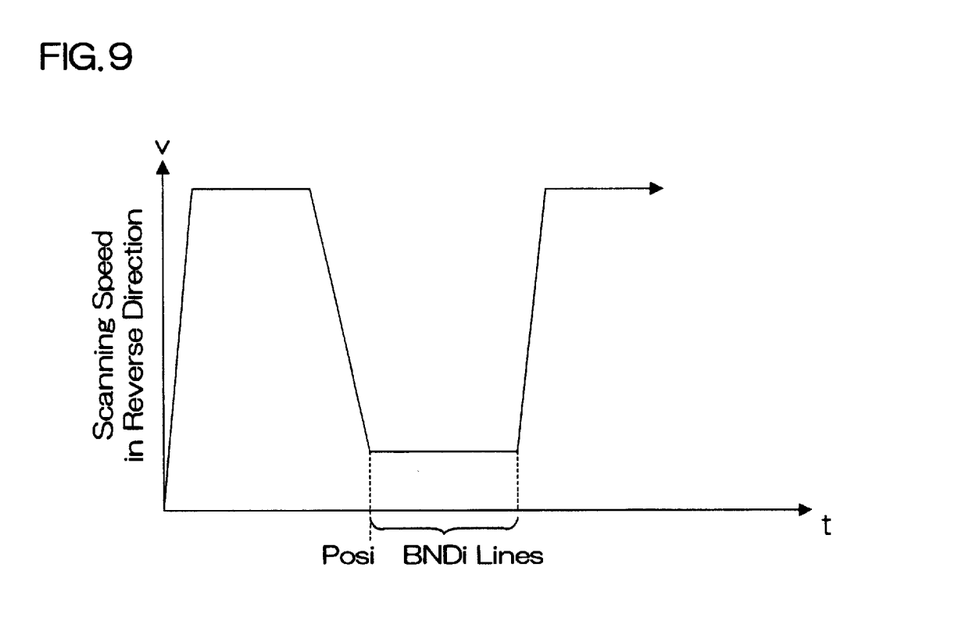
FIG. 9 illustrates the moving speed of the scan during reverse scanning.

FIG. 9 illustrates the change in the scanner moving speed during scanning in the reverse direction. In the scan in the reverse direction, the position requiring re-reading (i.e., the position of the lines from Posi to BNDi) is read by decreasing the scanner moving speed compared to the other areas. In this way image reading and compression can be reliably executed during the scan in the reverse direction.

The compressed data generated during the scans in the normal direction and the reverse direction are read out sequentially in accordance with the line position information contained in the header as shown in FIG. 6, and transmitted an external device via the peripheral interface 630 (refer to FIG. 2).

Although the present invention has been described in the previously described embodiments in examples of a reading device using a scanner, the present invention is also applicable to, for example, devices which process data in parallel with a sequential reading at a fixed speed of data stored in memory so as to read parts again after a processing overflow has occurred.

While the example used in the above embodiments pertain to execution of processes within a single device, such processing may be handled by a plurality of devices. For example, processing may be executed so as to apportion processing to the processors of multiple devices when a printer and an image scanner are connected via a network.

In the above examples, memory media are used to store the programs which execute the aforesaid processes, a construction may also be used wherein the programs are loaded in the microcomputer 600 so as to be executed by the microcomputer 600.

Furthermore, while the scanner operation is executed in the normal direction and the reverse direction in the above embodiments, the scanner operation may also be performed twice in the normal direction.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. An image processing device comprising:
   a scanner for scanning an image to provide the image data;
   an image processor for processing the image data which is provided by said scanner;
   a first controller for causing said scanner to scan the image to provide the image data and for causing said image processor to process the provided image data synchronously with the scanning operation of the scanner; and
   a second controller for, if a part of the image data have not been processed during the control operation of said first controller, causing the scanner to scan the image again to provide the image data of said part and also causing said image processor to process the provided image data of said part synchronously with the scanning operation of the scanner, wherein
   when the second controller causes the scanner to scan the image again, scanning speed is slower at positions of the image where the part of the image data have not been processed during the control operation of the first controller as compared with positions of the image where the image data have been processed during the control operation of the first controller.

2. An image processing device as claimed in claim 1, wherein said first controller causes the scanner to scan the image in a first direction and said second controller causes to scan the image in a second direction, opposite to the first direction.

3. An image processing device as claimed in claim 1, wherein said image processor compresses the image data which provided by said scanner.

4. An image processing device as claimed in claim 3, wherein total scanning speed for the second controller is slower than scanning speed for the first controller.

5. An image processing method comprising:

a first scanning step of scanning a document to provide an image data;

a first processing step of processing the image data which is provided by said scanning operation synchronously with the scanning operation a detecting step of detecting the image data of an unprocessible part for said first processing step among the image data provided by said first scanning step;

a second scanning step of scanning the document again to provide the image data corresponding to the unprocessible part; and a second processing step of processing the image data of the unprocessible part which is provided by said second scanning step, wherein scanning speed of the second scanning step is slower at positions of the document where the image data of the unprocessible part are detected in the detecting step as compared with positions of the document where the image data have been processed during the first processing step.

6. An image processing method as claimed in claim 5, wherein an overflow of the process of said first processing step is detected in the detecting step.

7. An image processing method as claimed in claim 5, wherein the image is scanned in the first direction in said first scanning step and is scanned in the second direction, opposite to the first direction, in said second scanning step.

8. An image processing method as claimed in claim 5, wherein, in said first and second processing steps, the image data is compressed.

9. An image processing method as claimed in claim 5, wherein total scanning speed in the second scanning step is slower than scanning speed in the first scanning step.

* * * * *